(12) United States Patent
Tambini (10) Patent No.: US 6,843,326 B2
(45) Date of Patent: Jan. 18, 2005

(54) METHOD AND APPARATUS FOR DETERMINING WHEN A FASTENER IS TIGHTENED TO A PREDETERMINED TIGHTNESS BY A PULSE OUTPUT TIGHTENING TOOL, AND A PULSED OUTPUT TIGHTENING TOOL INCORPORATING THE APPARATUS

(75) Inventor: Angelo Luigi Alfredo Tambini, Wicklow (IE)

(73) Assignee: Pat Technologies Limited, Naas (IE)

( * ) Notice: Subject to any disclaimer, the term of this patent is extended or adjusted under 35 U.S.C. 154(b) by 0 days.

(21) Appl. No.: 10/470,506

(22) PCT Filed: Jan. 29, 2002

(86) PCT No.: PCT/IE02/00009

§ 371 (c)(1),
(2), (4) Date: Jul. 29, 2003

(87) PCT Pub. No.: WO02/060650

PCT Pub. Date: Aug. 8, 2002

(65) Prior Publication Data

US 2004/0050567 A1 Mar. 18, 2004

(30) Foreign Application Priority Data

Jan. 29, 2001 (IE) .......................................... S2001/0060

(51) Int. Cl.[7] .............................................. B25B 23/14
(52) U.S. Cl. ............................. 173/1; 173/176; 173/183
(58) Field of Search ........................... 173/176, 1, 181, 173/182, 183, 2; 73/862.23, 862.24; 81/467, 470

(56) References Cited

U.S. PATENT DOCUMENTS

| 4,095,325 A | * | 6/1978 | Hashimoto et al. ...... 29/407.03 |
| 4,316,512 A | * | 2/1982 | Kibblewhite et al. ....... 173/183 |
| 4,358,735 A | * | 11/1982 | Boys ...................... 324/207.25 |
| 4,361,945 A | * | 12/1982 | Eshghy ..................... 29/407.03 |
| 4,609,089 A | * | 9/1986 | Kobayashi et al. ......... 192/138 |
| 4,648,282 A | * | 3/1987 | Alender et al. .......... 73/862.23 |
| 4,838,361 A | * | 6/1989 | O'Toole ...................... 173/182 |
| 5,285,857 A | * | 2/1994 | Shimada ........................ 173/1 |
| 5,457,866 A | * | 10/1995 | Noda ....................... 29/407.02 |
| 6,144,891 A | * | 11/2000 | Murakami et al. .......... 700/108 |
| 6,371,218 B1 | * | 4/2002 | Amano et al. .............. 173/183 |

* cited by examiner

Primary Examiner—Scott A. Smith
(74) Attorney, Agent, or Firm—Aaron Nerenberg (57) ABSTRACT

An impact wrench (1) comprising an output shaft (5) for receiving a socket or other fastener engaging element for tightening a fastener is powered by a pneumatic motor (11). Apparatus (20) for determining when the fastener has been tightened to a predetermined tightness comprises a body member (21) extending around the output shaft (5), and an eccentrically disposed member (24) on the output shaft (5) located within a central bore (30) of the body member (21). A pair of photo sensors (33a, 33b) in light accommodating bores (34a, 34b) receive light through the bores (34a, 34b) from corresponding light emitting diodes (36a, 36b). The eccentrically disposed member (24) is located in the central bore (30) relative to the light accommodating bores (34a, 34b), so that as the output shaft (5) rotates, the eccentrically disposed member (24) extends into the bores (34a, 34b) and alternates between a position where the bores (34) are almost completely occluded to a position where almost no occlusion of the bores (34) takes place, thereby varying the light intensity received by the photo sensors (33) from minimum light intensity to maximum light intensity. A monitoring circuit (42) reads the outputs from the photo sensors (33) for determining when the fastener is tightened to its snug point, and for determining when the fastener is tightened to the predetermined tightness by reading the outputs from the photo sensors (33) for determining when the output shaft (5) has been rotated through a predetermined angular displacement from the snug point corresponding to the predetermined tightness.

32 Claims, 7 Drawing Sheets

| Sine | Cos | Angle | Sine | Cos | Angle | Sine | Cos | Angle |
|---|---|---|---|---|---|---|---|---|
| 1.00 | 2.00 | 0 | 1.87 | .50 | 120 | .13 | .50 | 240 |
| 1.10 | 1.99 | 6 | 1.84 | .41 | 126 | .09 | .59 | 246 |
| 1.21 | 1.98 | 12 | 1.74 | .33 | 132 | .05 | .69 | 252 |
| 1.31 | 1.95 | 18 | 1.67 | .26 | 138 | .02 | .79 | 258 |
| 1.41 | 1.91 | 24 | 1.59 | .19 | 144 | .01 | .90 | 264 |
| 1.50 | 1.87 | 30 | 1.50 | .13 | 150 | 0 | 1.00 | 270 |
| 1.59 | 1.81 | 36 | 1.41 | .09 | 156 | 0.1 | 1.10 | 276 |
| 1.67 | 1.74 | 42 | 1.31 | .05 | 162 | .02 | 1.21 | 282 |
| 1.74 | 1.67 | 48 | 1.21 | .02 | 168 | .05 | 1.31 | 288 |
| 1.81 | 1.59 | 54 | 1.10 | .01 | 174 | .09 | 1.41 | 294 |
| 1.87 | 1.50 | 60 | 1.00 | 0 | 180 | .13 | 1.50 | 300 |
| 1.91 | 1.41 | 66 | .90 | .01 | 186 | .19 | 1.59 | 306 |
| 1.95 | 1.31 | 72 | .79 | .02 | 192 | .26 | 1.67 | 312 |
| 1.98 | 1.21 | 78 | .69 | .05 | 198 | .33 | 1.74 | 318 |
| 1.99 | 1.10 | 84 | .59 | .09 | 204 | .41 | 1.81 | 324 |
| 2.00 | 1.00 | 90 | .50 | .13 | 210 | .50 | 1.87 | 330 |
| 1.99 | .90 | 96 | .41 | .19 | 216 | .59 | 1.91 | 336 |
| 1.98 | .79 | 102 | .33 | .26 | 222 | .69 | 1.95 | 342 |
| 1.95 | .69 | 108 | .26 | .33 | 228 | .79 | 1.98 | 348 |
| 1.91 | .59 | 114 | .19 | .41 | 234 | 0.90 | 1.99 | 354 |
|  |  |  |  |  |  | 1.00 | 2.00 | 360 |

Fig. 10

METHOD AND APPARATUS FOR DETERMINING WHEN A FASTENER IS TIGHTENED TO A PREDETERMINED TIGHTNESS BY A PULSE OUTPUT TIGHTENING TOOL, AND A PULSED OUTPUT TIGHTENING TOOL INCORPORATING THE APPARATUS

The present invention relates to apparatus for use in a pulsed output tightening tool for determining when a fastener being tightened by the tool is tightened to a predetermined tightness. The invention also relates to a pulsed output tightening tool, and in particular, though not limited to an impact wrench incorporating the apparatus, and the invention also relates to a method for determining when a fastener is tightened to a predetermined degree of tightness by a pulsed output tightening tool.

Pulsed output tightening tools are known. One such tool is typically referred to as an impact wrench which in general, is pneumatically powered. Typically, impact wrenches comprise a housing within which an output shaft is rotatably mounted. An anvil member is located at one end of the output shaft, and a hammer mechanism located within the housing co-operates with the anvil for intermittently imparting high energy impacts to the anvil for in turn imparting corresponding pulsed tightening moments on the output shaft for tightening a fastener. The output shaft typically terminates in a receiver of square section for receiving a socket or other fastener engaging element for engaging the fastener for tightening thereof. The hammer mechanism typically is operated by a motor, a drive shaft of which carries the hammer mechanism so that typically on each 180° or 360° of angular rotation of the drive shaft the hammer mechanism impacts on the anvil. While in general impact wrenches are pneumatically powered, they may also be powered by an hydraulic or an electrically powered motor. In general, impact wrenches continuously rotate the fastener until resistance to tightening is encountered, at which stage continuous rotating of the fastener ceases and further rotation of the fastener is achieved by the intermittent pulsed tightening moments which are imparted to the output shaft by the intermittent impacting of the hammer mechanism with the anvil.

In general, when continuous rotation of the fastener ceases, the fastener, in general, is said to be tightened to or towards its snug point, in other words, the point at which the parts of a joint being secured by the fastener become clamped and the linear tightening of the fastener has begun. It is important to determine when a fastener is tightened to a desired predetermined tightness. In continuously running tightening tools it is normal to control the torque to which the fastener is tightened. This is achieved by monitoring the tightening torque to which the fastener is being subjected, and on the tightening torque reaching a predetermined value, the fastener is deemed to have been tightened to the desired predetermined tightness. However, monitoring the torque to which a fastener is tightened by an impact tool proves considerably more difficult than monitoring the torque in a continuously running tightening tool, since a direct reading of torque is unavailable.

Various alternative techniques for determining when a fastener has been tightened to a desired predetermined tightness by an impact tool have been used. One such technique requires that the fastener be tightened to its snug point, and then be tightened through a predetermined angle from the snug point. This technique requires physically and manually measuring the angle through which the fastener is tightened from the snug point. Another technique requires that the fastener be tightened to its yield point. However, in general, these techniques suffer from various disadvantages, in particular, the level of accuracy is relatively low, and can be variable, and in many cases special tuning and calibration of the tool before each use is required.

U.S. Patent Specification No. 4,316,512 of Kibblewhite, et al discloses an impact wrench which incorporates a control system for determining when a fastener has been tightened to a predetermined tightness. In the impact wrench of Kibblewhite the fastener is tightened to its yield point. Kibblewhite's impact wrench comprises a rotary encoder which is attached to the output shaft for determining the angular displacement of the output shaft. In order to determine when the fastener has been tightened to the yield point, Kibblewhite monitors the angular displacement of the output shaft and time. By measuring the time over a fixed rotational angle as a parameter representative of torque, and then applying gradient comparison techniques, Kibblewhite determines the yield point. While the impact wrench of Kibblewhite is suitable for tightening a fastener to its yield point, it is incapable of tightening a fastener to any other predetermined tightness with any degree of accuracy. Incremental rotary encoders of the type disclosed in the Kibblewhite impact wrench, with the robustness required in an impact wrench by their nature tend to give poor angular resolution. Indeed, the incremental rotary encoder of Kibblewhite has a resolution of approximately 5°. This is insufficient for determining with practical accuracy when a fastener has been tightened to its snug point, and is also incapable of accurately detecting the angular displacement of the fastener resulting from each pulsed tightening moment. Accordingly, the impact wrench of Kibblewhite takes no account of the snug point of the fastener, and thus, does not provide an adequate level of accuracy in determining when a fastener has been tightened to a predetermined tightness other than the yield point.

There is therefore a need for an apparatus for use in a pulsed output tightening tool which overcomes the problems of prior art devices, for determining when a fastener is tightened to a predetermined tightness, and there is also a need for a method for determining when a fastener has been tightened by a pulsed output tightening tool to a predetermined tightness. There is also a need for a pulsed output tightening tool for tightening a fastener to a predetermined tightness.

The present invention is directed towards providing such an apparatus, a method and a pulsed output tightening tool.

According to the invention there is provided apparatus for use in a pulsed output tightening tool for determining when a fastener being tightened by a rotatable output means of the tool is tightened to a predetermined tightness, the apparatus comprising a detectable means for mounting on the rotatable output means of the tool and being rotatable therewith for providing a varying detectable characteristic as the output means rotates about its rotational axis, and a monitoring means for monitoring the detectable means for determining rotational angular displacement of the output means, wherein a means is provided co-operable with the monitoring means for determining when the fastener is tightened to its snug point, and for determining when the fastener is tightened to the predetermined tightness in response to the angular displacement of the rotatable output means from its position corresponding to the snug point of the fastener.

In one embodiment of the invention the means for determining when the fastener is tightened to its snug point is responsive to the monitoring means detecting the angular displacement of the output means being less than a first reference predetermined angular displacement in response to one pulsed output of the output means.

In another embodiment of the invention the means for determining when the fastener is tightened to the predetermined tightness is responsive to the monitoring means determining that the rotatable output means has rotated a second reference predetermined angular displacement from its snug point position.

In a further embodiment of the invention the means for determining when the fastener is tightened to its snug point is responsive to the monitoring means detecting the first stalling of the output means after tightening of the fastener commences.

Preferably, the detectable characteristic provided by the detectable means alternately and smoothly cycles between a minimum value of the detectable characteristic and a maximum value of the detectable characteristic as the output means rotates for facilitating a determination of the angular displacement of the output means in response to each pulsed output of the output means.

In one embodiment of the invention the detectable characteristic of the detectable means cycles through each of the minimum and maximum values of the detectable characteristic at least once for each 360° angular displacement of the output means.

In another embodiment of the invention the detectable characteristic provided by the detectable means varies between the minimum value and the maximum value for each 180° of angular displacement of the output means.

In a further embodiment of the invention the monitoring means outputs a signal indicative of the angular displacement of the output means. Preferably, the monitoring means outputs an electronic signal. Advantageously, the monitoring means co-operates with the detectable means for detecting the absolute angular position of the output means.

In one embodiment of the invention the detectable means comprises an eccentrically disposed member eccentrically disposed relative to the output means. Preferably, the eccentrically disposed member defines an eccentric surface, eccentrically disposed relative to the output means. Advantageously, the eccentrically disposed member defines a central axis, and is adapted for mounting on the output means with the central axis of the eccentrically disposed member spaced apart from and parallel to the rotational axis of the output means for causing the eccentrically disposed member to rotate eccentrically with the output means. Ideally, the eccentric surface defined by the eccentrically disposed member is a cylindrical surface.

In one embodiment of the invention the monitoring means is a light sensing means. Preferably, the light sensing means co-operates with the detectable means so that light passing the detectable means to the light sensing means is at least partially occluded by the detectable means as the output means rotates, and the degree of occlusion alternates between minimum and maximum values corresponding to the minimum and maximum values of the detectable characteristic. Advantageously, a body member is provided adjacent the detectable means, and a light accommodating bore extends through the body member for directing light onto the light sensing means, an opening being provided into the light accommodating bore for accommodating the detectable means into the light accommodating bore as the output means rotates so that the light accommodating bore is at least partly occluded by the detectable means as the output means rotates, the degree of occlusion alternating between the respective minimum and maximum values thereof as the output means rotates.

In one embodiment of the invention at maximum occlusion the detectable means substantially occludes the light accommodating bore, and at minimum occlusion the detectable means just slightly occludes the light accommodating bore.

In one embodiment of the invention a light source is provided at one end of the light accommodating bore and the light sensing means is provided at the other end thereof, the opening for accommodating the detectable means into the light accommodating bore being located intermediate the ends thereof. Preferably, the light sensing means is a photo sensor.

Advantageously, a pair of monitoring means is provided, the respective monitoring means being angularly spaced apart around the detectable means for facilitating determining of the absolute angular position of the output means. Preferably, the respective monitoring means are disposed at 90° to each other around the detectable means.

In one embodiment of the invention the apparatus comprises a calibrating means for calibrating the apparatus. Preferably, the calibrating means is operable for calibrating the apparatus when the output means is rotating at a substantially constant speed.

Additionally the invention provides apparatus for use in a pulsed output tightening tool for determining when a fastener being tightened by a rotatable output means of the tool is tightened to a predetermined tightness, the apparatus comprising a detectable means for mounting on the rotatable output means of the tool and being rotatable therewith for providing a varying detectable characteristic as the output means rotates about its rotational axis, and a monitoring means for monitoring the detectable means for determining rotational angular displacement of the output means, wherein the detectable characteristic provided by the detectable means alternately and smoothly cycles between a minimum value of the detectable characteristic and a maximum value of the detectable characteristic as the output means rotates for facilitating a determination of the angular displacement of the output means in response to each pulsed output of the output means for determining when the fastener is tightened to the predetermined tightness.

In one embodiment of the invention the detectable characteristic of the detectable means cycles through each of the minimum and maximum values of the detectable characteristic at least once for each 360° angular displacement of the output means.

In another embodiment of the invention the detectable characteristic provided by the detectable means varies between the minimum value and the maximum value for each 180° of angular displacement of the output means.

In a further embodiment of the invention the monitoring means outputs a signal indicative of the angular displacement of the output means.

Preferably, the monitoring means outputs an electronic signal.

Advantageously, the monitoring means co-operates with the detectable means for detecting the absolute angular position of the output means.

In one embodiment of the invention a means is provided for determining when the fastener is tightened to its snug point.

In one embodiment of the invention the means for determining when the fastener is tightened to its snug point is responsive to the monitoring means detecting the first stalling of the output means after tightening of the fastener commences.

In another embodiment of the invention the means for determining when the fastener is tightened to its snug point is responsive to the monitoring means detecting the angular displacement of the output means being less than a first reference predetermined angular displacement in response to one pulsed output of the output means.

In a further embodiment of the invention the monitoring means comprises a computing means for computing the angular displacement of the output means after the fastener is tightened to its snug point for determining when the fastener is tightened to the predetermined tightness.

Preferably, the detectable means comprises an eccentrically disposed member eccentrically disposed relative to the output means. Advantageously, the eccentrically disposed member defines an eccentric surface, eccentrically disposed relative to the output means. Ideally, the eccentrically disposed member defines a central axis, and is adapted for mounting on the output means with the central axis of the eccentrically disposed member spaced apart from and parallel to the rotational axis of the output means for causing the eccentrically disposed member to rotate eccentrically with the output means.

Preferably, the eccentric surface defined by the eccentrically disposed member is a cylindrical surface.

In one embodiment of the invention the monitoring means is a light sensing means.

In another embodiment of the invention the light sensing means co-operates with the detectable means so that light passing the detectable means to the light sensing means is at least partially occluded by the detectable means as the output means rotates, and the degree of occlusion alternates between minimum and maximum values corresponding to the minimum and maximum values of the detectable characteristic.

In a further embodiment of the invention a body member is provided adjacent the detectable means, and a light accommodating bore extends through the body member for directing light onto the light sensing means, an opening being provided into the light accommodating bore for accommodating the detectable means into the light accommodating bore as the output means rotates so that the light accommodating bore is at least partly occluded by the detectable means as the output means rotates, the degree of occlusion alternating between the respective minimum and maximum values thereof as the output means rotates.

Preferably, at maximum occlusion the detectable means substantially occludes the light accommodating bore, and advantageously, at minimum occlusion the detectable means just slightly occludes the light accommodating bore.

In one embodiment of the invention a light source is provided at one end of the light accommodating bore and the light sensing means is provided at the other end thereof, the opening for accommodating the detectable means into the light accommodating bore being located intermediate the ends thereof.

In another embodiment of the invention the light sensing means is a photo sensor.

In a further embodiment of the invention a pair of monitoring means is provided, the respective monitoring means being angularly spaced apart around the detectable means for facilitating determining of the absolute angular position of the output means.

Ideally, the respective monitoring means are disposed at 90° to each other around the detectable means.

Further the invention provides a pulsed output tightening tool comprising an output means rotatably mounted about a rotational axis for intermittently imparting a pulsed tightening moment to a fastener for tightening thereof, and apparatus for determining when a fastener being tightened by the tool is tightened to a predetermined tightness, wherein the apparatus for determining when the fastener is tightened to the predetermined tightness comprises the apparatus according to the invention.

The invention also provides a pulsed output tightening tool comprising a rotatable output means rotatably mounted about a rotational axis for intermittently imparting a pulsed tightening moment to a fastener for tightening thereof, a detectable means being mounted on the output means and being rotatable therewith for providing a varying detectable characteristic as the output means rotates, and a monitoring means for monitoring the detectable means for determining rotational angular displacement of the output means wherein a means is provided co-operable with the monitoring means for determining when the fastener is tightened to its snug point, and for determining when the fastener is tightened to the predetermined tightness in response to the angular displacement of the rotatable output means from its position corresponding to the snug point of the fastener.

In one embodiment of the invention the output means comprises an output shaft defining the cylindrical surface adjacent the detectable means.

In another embodiment of the invention the pulsed output tightening tool is an impact wrench, and the output shaft extends from an anvil.

In a further embodiment of the invention a hammer mechanism is provided for co-operating with the anvil for intermittently impacting with the anvil for providing the respective pulsed tightening moments.

In one embodiment of the invention a drive means is provided for operating the hammer mechanism for intermittently impacting with the anvil.

In another embodiment of the invention the drive means comprises a drive motor.

In a further embodiment of the invention the drive means comprises a pneumatic motor.

In one embodiment of the invention a pneumatic turbine electrical generator is located adjacent an exhaust from the pneumatic motor for recovering power from the exhaust of the pneumatic motor for generating electricity for powering the monitoring means.

In a further embodiment of the invention a cut-out means is provided for isolating the drive means from a power source.

In a still further embodiment of the invention the cut-out means is responsive to the monitoring means determining that the fastener has been tightened to the predetermined tightness.

In another embodiment of the invention a radio receiving circuit is provided, and the radio receiving circuit is responsive to a control signal received from a transmitter for operating the cut-out means for isolating power to the drive means.

In a further embodiment of the invention the transmitter is responsive to the monitoring means determining that the fastener has been tightened to the predetermined tightness.

The invention also provides a pulsed output tightening tool comprising an output means rotatably mounted about a rotational axis for intermittently imparting a pulsed tightening moment to a fastener for tightening thereof, a detectable means being mounted on the output means and being rotatable therewith for providing a varying detectable characteristic as the output means rotates, and a monitoring means for monitoring the detectable means for determining rotational angular displacement of the output means wherein the detectable characteristic provided by the detectable means alternately and smoothly cycles between a minimum value of the detectable characteristic and a maximum value of the detectable characteristic as the output means rotates for facilitating a determination of the angular displacement of the output means in response to each pulsed output of the output means for determining when the fastener is tightened to the predetermined tightness.

In one embodiment of the invention the detectable characteristic of the detectable means cycles through each of the minimum and maximum values of the detectable characteristic at least once for each 360° angular displacement of the output means.

In another embodiment of the invention the detectable characteristic provided by the detectable means varies between the minimum value and the maximum value for each 180° of angular displacement of the output means.

In a further embodiment of the invention the monitoring means outputs a signal indicative of the angular displacement of the output means.

Preferably, the monitoring means outputs an electronic signal.

Advantageously, the monitoring means co-operates with the detectable means for detecting the absolute angular position of the output means.

In another embodiment of the invention a means is provided for determining when the fastener is tightened to its snug point.

In a further embodiment of the invention the means for determining when the fastener is tightened to its snug point is responsive to the monitoring means detecting the first stalling of the output means after tightening of the fastener commences.

In a still further embodiment of the invention the means for determining when the fastener is tightened to its snug point is responsive to the monitoring means detecting the angular displacement of the output means in response to a pulsed output being less than a predetermined angular displacement.

Further the invention provides a method for determining when a fastener is tightened to a predetermined tightness by a rotatable output means of a pulsed output tightening tool, wherein the method comprises the steps of determining when the fastener is tightened to its snug point, and monitoring the rotational angular displacement of the output means from its position corresponding to the snug point of the fastener until the output means rotates through a second reference predetermined angular displacement from its snug point position corresponding to the predetermined tightness.

In one embodiment of the invention the fastener is determined as having been tightened to its snug point in response to detecting the first stalling of rotation of the output means after tightening of the fastener has commenced.

In another embodiment of the invention the fastener is determined as having been tightened to its snug point when the angular displacement of the output means in response to one pulsed output is less than a first reference predetermined forward angular displacement.

In a further embodiment of the invention the angular displacement of the output means from its snug point position is compared with a selected one of a plurality of the second reference angular displacement after each pulsed output for determining when the fastener has been tightened to the predetermined tightness.

Further the invention provides a method for tightening a fastener to a predetermined tightness using a pulsed output tightening tool having a rotatable output means for tightening the fastener, the method comprising the steps of tightening the fastener to its snug point with the rotatable output means, and monitoring the angular displacement of the output means from its angular position corresponding to the snug point of the fastener until the output means has rotated through a second reference predetermined angular displacement from its snug point position corresponding to the predetermined tightness.

Therefore there is provided an impact wrench or other impulse tool for tightening a threaded fastener assembly to a significantly tightened condition of rotation, torque or yield. There is also provided a control system using measurements of rotation and time for tightening a fastener assembly to a clearly defined point such that there is extremely high probability that the fastener has been tightened to the defined point. The invention also provides a self-contained control system mounted on an impact wrench that includes apparatus for measuring absolute shaft angular position, apparatus for receiving the angular position signals and determining when the tightening process has started and for shutting off the tool when the fastener has reached a desired point of significant tightness, and apparatus for generating electric power to drive the control system. The invention further provides an integral, self-contained impact wrench system that greatly improves the control of fastener tightening and is robust, compact, inexpensive and self-contained.

The invention also provides a system for determining the snug or starting point of the fastener tightening from the change in shaft speed as the starting point for angle tightening, as well as a system for determining the tightness of the fastener by measuring the forward turning angle from the snug point. The invention provides a system in which the control algorithm stops the tightening process at a specific rotation angle and inspects the achieved torque and yield point, a system with self-contained electrical power utilising the exhaust air from the tool to drive a small generator, as well as a system in which the start signal for each cycle is produced by the step voltage from the generator. The invention also provides a system in which the shut-off signal for the tool is transmitted to a shut-off valve mounted off the tool by wire or wireless methods.

The advantages of the invention are many. A particularly important advantage achieved by the invention is that it facilitates relatively accurate tightening of a fastener to a desired predetermined tightness. This is achieved by virtue of the fact that the apparatus according to the invention can relatively precisely determine the angular displacement of the output shaft of the pulsed output tightening tool in response to each pulsed tightening moment, and also by virtue of the fact that the apparatus according to the invention determines the absolute angular position of the output shaft, which likewise corresponds to the absolute angular position of the fastener. This, combined with the relatively accurate monitoring of the angular displacement of the shaft facilitates a determination of when the fastener is tightened to its snug point, and once the snug point is determined, then by relatively accurately determining the angular displacement of the output shaft from the snug point position, the tightness of the fastener can readily be determined, since the angular displacement of the output shaft from the snug point is proportional to the torque to which the fastener is tightened.

These advantages of the invention are achieved largely by virtue of the fact that the detectable characteristic provided by the detectable means alternates and smoothly cycles between a minimum value of the detectable characteristic and a maximum value of the detectable characteristic as the output means rotates. By providing the detectable means as an eccentrically mounted member on the output shaft, and in particular, by providing the detectable means as an eccentrically mounted member having a cylindrical surface, a particular advantage of the invention is achieved by virtue of the fact that the cycling of the detectable characteristic between the respective minimum and maximum values is particularly smooth, and thus provides an output of substantially sinusoidal form. By detecting the detectable characteristic by a light sensing means, a particularly advantageous form of the apparatus according to the invention is provided, in that the monitoring means is a contactless monitoring means, and thus robust. Indeed, by providing the detectable means on the output means, a relatively accurate determination of the angular displacement of the fastener can be determined, since backlash is minimised, and furthermore, the apparatus according to the invention, and in turn a pulsed output tightening tool comprising the apparatus according to the invention of relatively robust construction can be provided.

The invention will be more clearly understood from the following description of a preferred embodiment thereof, which is given by way of example only, with reference to the accompanying drawings, in which:

Figure 1:
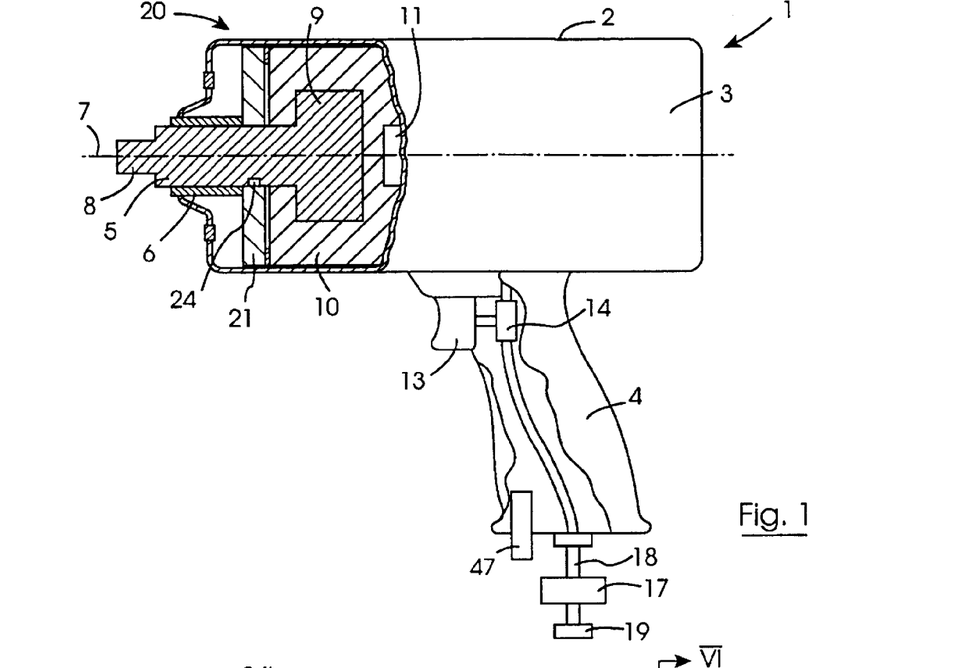
FIG. 1 is a partly cutaway, partly cross-sectional and partly diagrammatic side elevational view of an impact wrench according to the invention.
Figure 2:
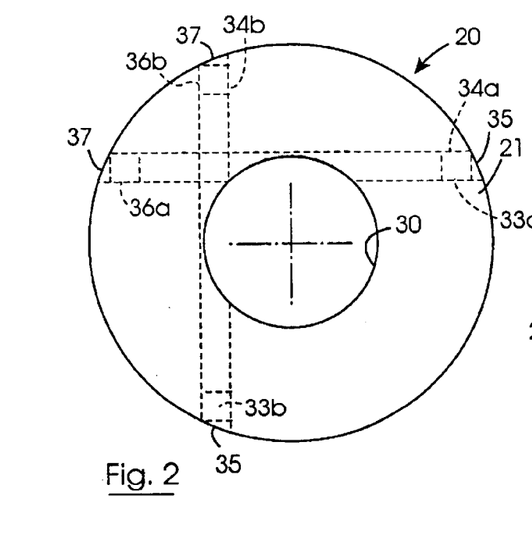
FIG. 2 is an end elevational view of a portion of the impact wrench of FIG. 1.
Figure 3:
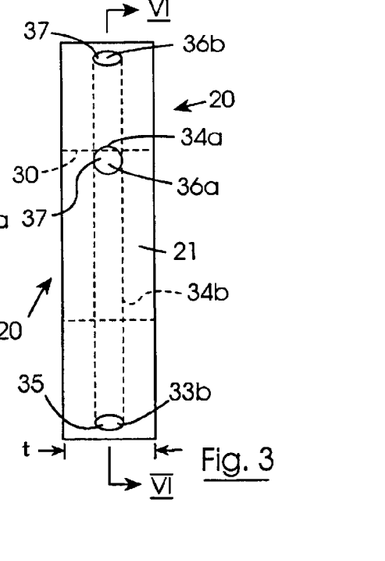
FIG. 3 is a side elevational view of the portion of FIG. 2 of the impact wrench of FIG. 1.

Referring to the drawings, there is illustrated a pulsed output tightening tool according to the invention which in this embodiment of the invention is an impact wrench indicated generally by the reference numeral 1 for tightening a fastener (not shown), for example, a screw, nut or the like of a joint assembly (also not shown) to a predetermined tightness. The impact wrench 1 comprises an outer casing 2 which defines a main body portion 3, and a handle 4 extending downwardly from the main body portion 3. An output means, namely, an output shaft 5 of circular transverse cross-section is rotatably carried in a bearing 6 in the main body portion 3 of the casing 2 for outputting intermittent pulsed tightening moments for tightening, and also for loosening the fastener. The output shaft 5 defines a rotational axis 7 about which the output shaft 5 is rotatable, and terminates at one end in a receiving means, namely, a square section receiver 8 for receiving a socket or other appropriate fastener engaging element for engaging the fastener to be tightened or loosened.

The output shaft 5 at its other end terminates in the main body portion in an anvil 9. A hammer mechanism 10, illustrated in block representation in FIG. 1, co-operates with the anvil 9 for intermittently impacting with the anvil 9, for in turn inducing intermittent pulsed tightening moments in the output shaft 5 for imparting to the fastener. A motor 11 which is also illustrated in block representation in FIG. 1, which in this embodiment of the invention is a pneumatic motor, is located within the main body portion 3 for driving the hammer mechanism so that on each 360° of rotation of the motor shaft the hammer mechanism 10 impacts with the anvil 9. A trigger switch 13 in the handle 4 operates a pneumatic valve 14 also located in the handle 4 for supplying pressurised air to the motor 11. These aspects of the impact wrench 1 are substantially similar to a conventional impact wrench 1, and will be well known to those skilled in the art, as will the operation of these aspects of the impact wrench 1, and in particular, the operation of the hammer mechanism 10 of the impact wrench 1 will likewise be well known to those skilled in the art. Briefly, initially the output shaft 5 is continuously rotated by the motor 11 until the fastener meets resistance. Thereafter the hammer mechanism 10 commences to operate and intermittently impacts with the anvil for intermittently outputting pulse tightening moments on the output shaft 5 to further tighten the fastener.

Air is supplied to the pneumatic valve 14 through a cut-out means, namely, a solenoid operated pneumatic cut-out valve 17 located externally of but adjacent the handle 4 in an air supply line 18 to the impact wrench 1. The cut-out valve 17 is responsive as will be described below to the fastener being tightened to the predetermined tightness for cutting off the air supply to the motor 11. An inlet port 19 to the cut-out valve 17 is provided for connecting the cut-out valve 17 to the pressurised air supply.

Figure 4:
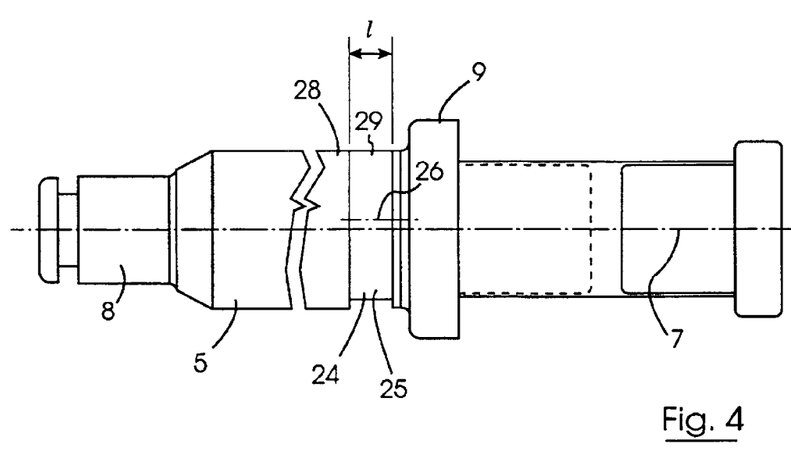
FIG. 4 is a side elevational view of another portion of the impact wrench of FIG. 1.

Apparatus also according to the invention and indicated generally by the reference numeral 20 for determining when a fastener has been tightened to the predetermined tightness is located within the main body portion 3 around the output shaft 5 adjacent the anvil 9. The apparatus 20 comprises a body member 21 which extends around the output shaft 5. A detectable means, namely, an eccentrically disposed member 24 is located in the output shaft 5 within the body member 21 and provides a varying detectable characteristic as the output shaft 5 rotates, as will be described below, for determining the absolute angular position of the output shaft 5, and also the angular displacement of the output shaft 5 in response to each pulsed tightening moment outputted on the output shaft 5. In this embodiment of the invention the eccentrically disposed member 24 is integrally formed with the output shaft 5 during turning of the output shaft 5. However, it will be readily apparent to those skilled in the art that the eccentrically disposed member 24 could be a bolt-on eccentrically disposed member which would facilitate retrofitting of the apparatus 20 to a conventional impact wrench. The eccentrically disposed member 24 defines a cylindrical surface 25 and a central axis 26 which extends parallel to but is offset from the main rotational axis 7 of the output shaft 5. The diameter of the eccentrically disposed member 24 is less than the diameter of the output shaft 5, and is selected along with the offset of the central axis 26 from the main rotational axis 7 so that the cylindrical surface 25 of the eccentrically disposed member 24 is tangential to a cylindrical surface 28 of the output shaft 5 at 29 adjacent the eccentrically disposed member 24, see FIG. 4.

The body member 21 is of thickness t greater than the length I of the eccentrically disposed member 24, and is provided with a central bore 30 of diameter just greater than the diameter of the cylindrical surface 28 of the output shaft 5 for rotatably accommodating the output shaft 5 in the body member 21. Additionally the body member 21 is located so that the eccentrically disposed member 24 is located completely within the central bore 30, see FIG. 5.

Figure 5:
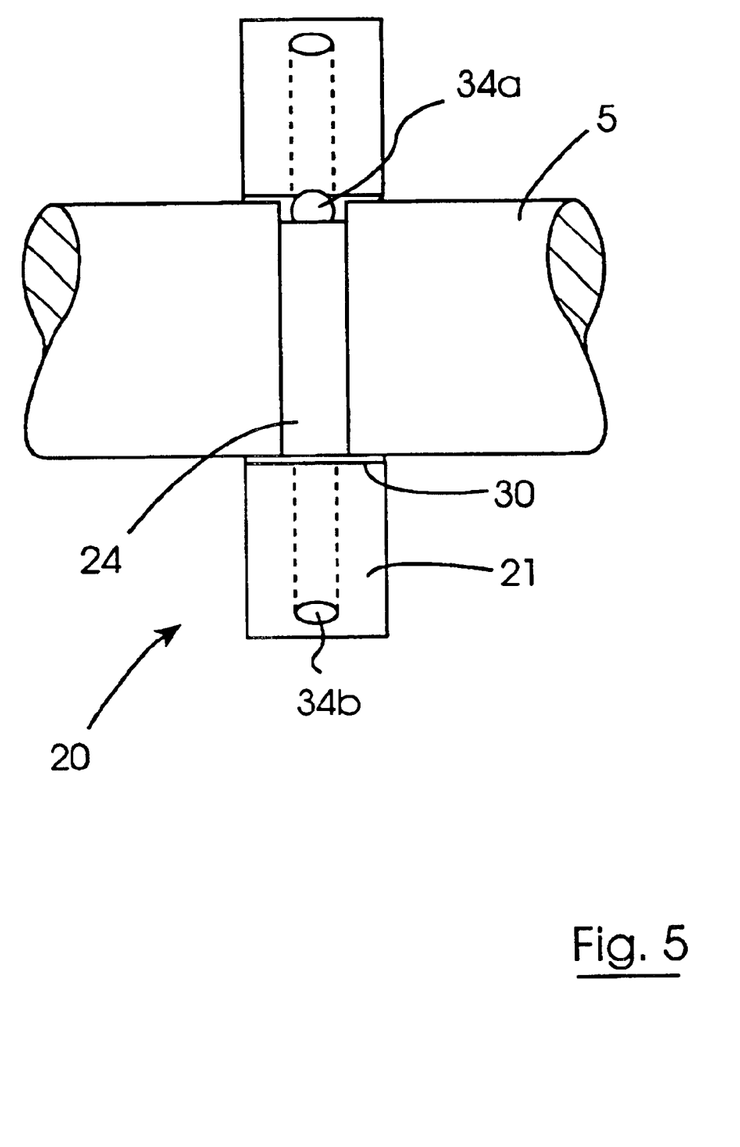
FIG. 5 is a cross-sectional side elevational view of the portions of FIGS. 2 to 4 assembled.

A pair of monitoring means for co-operating with the eccentrically disposed member 24 for monitoring the absolute angular position of the output shaft 5, in this embodiment of the invention comprises a pair of light sensing means provided by monitoring photo sensors 33a and 33b. The photo sensors 33a and 33b are located in corresponding light accommodating bores 34a and 34b which are disposed at 90° to each other through the body member 21. The photo sensors 33 are located at one end 35 of the respective bores 34, and corresponding light sources, namely, light emitting diodes 36a and 36b are provided at the other end 37 of the respective light accommodating bores 34 for directing light through the respective bores 34 to the corresponding photo sensors 33. The light accommodating bores 34 extend through and are substantially tangential to the central bore 30 through the body member 21, which thus forms openings 38 at the respective areas of intersection of the light accommodating bores 34 with the central bore 30. The eccentrically disposed member 24 is accommodated into the respective light accommodating bores 34 as the output shaft 5 rotates.

The diameters and positioning of the light accommodating bores 34 relative to the central bore 30 and the eccentrically disposed member 24 is such that as the output shaft 5 rotates, the eccentrically disposed member 24 extends into the respective light accommodating bores 34 for occluding the respective light accommodating bores 34, and thereby restricting the passage of light through the bores 34 to the photo sensors 33. As the output shaft 5 rotates, the degree to which the eccentrically disposed member 24 occludes the respective light accommodating bores 34 alternates and smoothly cycles between maximum occlusion, whereby a minimum amount of light passes through the maximum occluded light accommodating bore 34, and minimum occlusion, whereby a maximum amount of light passes through the minimum occluded light accommodating bore 34. For each 360° of rotation of the output shaft 5 the amount of light passing through each bore 34 cycles between minimum and maximum. At maximum occlusion the eccentrically disposed member 24 does not completely occlude the bores 34, but rather some light is allowed to pass through the bores 34 to the corresponding photo sensor 33, see FIGS. 6(a) and 6(b) where the occlusion of the bores 34a and 34b, respectively, is maximum. At minimum occlusion the eccentrically disposed member 24 still partly occludes the bores 34, see FIGS. 6(c) and 6(d) where the occlusion of the bores 34a and 34b, respectively, is minimum.

Due to the fact that the surface 25 of the eccentrically disposed member 24 is cylindrical, the eccentrically disposed member 24 transitions progressively and smoothly into the light accommodating bores 34 from minimum to maximum occlusion, and transitions regressively and smoothly from the light accommodating bores 34 from maximum to minimum occlusion. Thus, the level of light intensity received by the photo sensors 33 transitions progressively and smoothly from minimum light intensity when the occlusion of the respective bores 34 is maximum to maximum light intensity when the occlusion of the respective bores 34 by the eccentrically disposed member 24 is minimum, and vice versa. Thus, by sufficiently frequently reading the outputs of the photo sensors 33, as will be described below, the angular displacement of the output shaft 5 resulting from each pulsed tightening moment can be determined, and due to the fact that a pair of photo sensors 33 are provided disposed around the central bore 30 at 90° to each other, the absolute angular position of the output shaft 5 can be determined.

Figure 6:
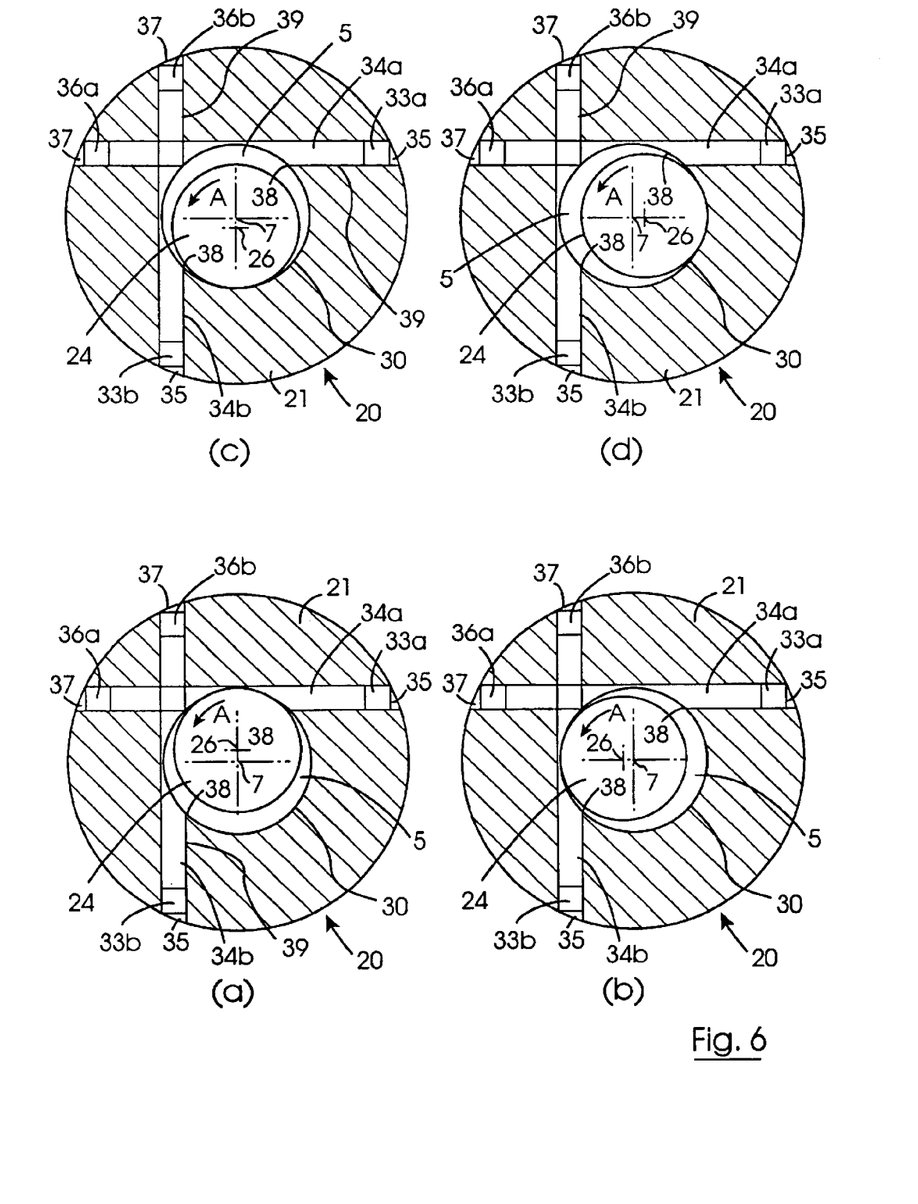
FIGS. 6(a) to (d) are cross-sectional end elevational views of the portion of FIG. 5 on the line VI—VI of FIG. 5.

In FIG. 6(a) the occlusion of the light accommodating bore 34a by the eccentrically disposed member 24 is illustrated at a maximum. Also in FIG. 6(a) the light accommodating bore 34b is approximately 50% occluded by the eccentrically disposed member 24. As the output shaft 5 rotates in the direction of the arrow A, the degree of occlusion of the light accommodating bore 34a regresses, however, the degree of occlusion of the light accommodating bore 34b progressively increases. When the output shaft 5 has rotated through 90° from the angular position illustrated in FIG. 6(a) to the position illustrated in FIG. 6(b), the occlusion of the bore 34b by the eccentrically disposed member 24 is maximum, and the degree of occlusion of the light accommodating bore 34a is approximately 50%. A further 90° rotation of the output shaft 5 in the direction of the arrow A to the position illustrated in FIG. 6(c) leaves the light accommodating bore 34a with minimum occlusion, and the light accommodating bore 34b partly occluded with approximately 50% occlusion, and so on. It should be noted here that the edges 39 of the respective light accommodating bores 34 are almost but not quite tangential to the eccentrically disposed member 24 at minimum occlusion, so that at minimum occlusion the eccentrically disposed member 24 projects slightly into the corresponding bore 34.

Figure 7:
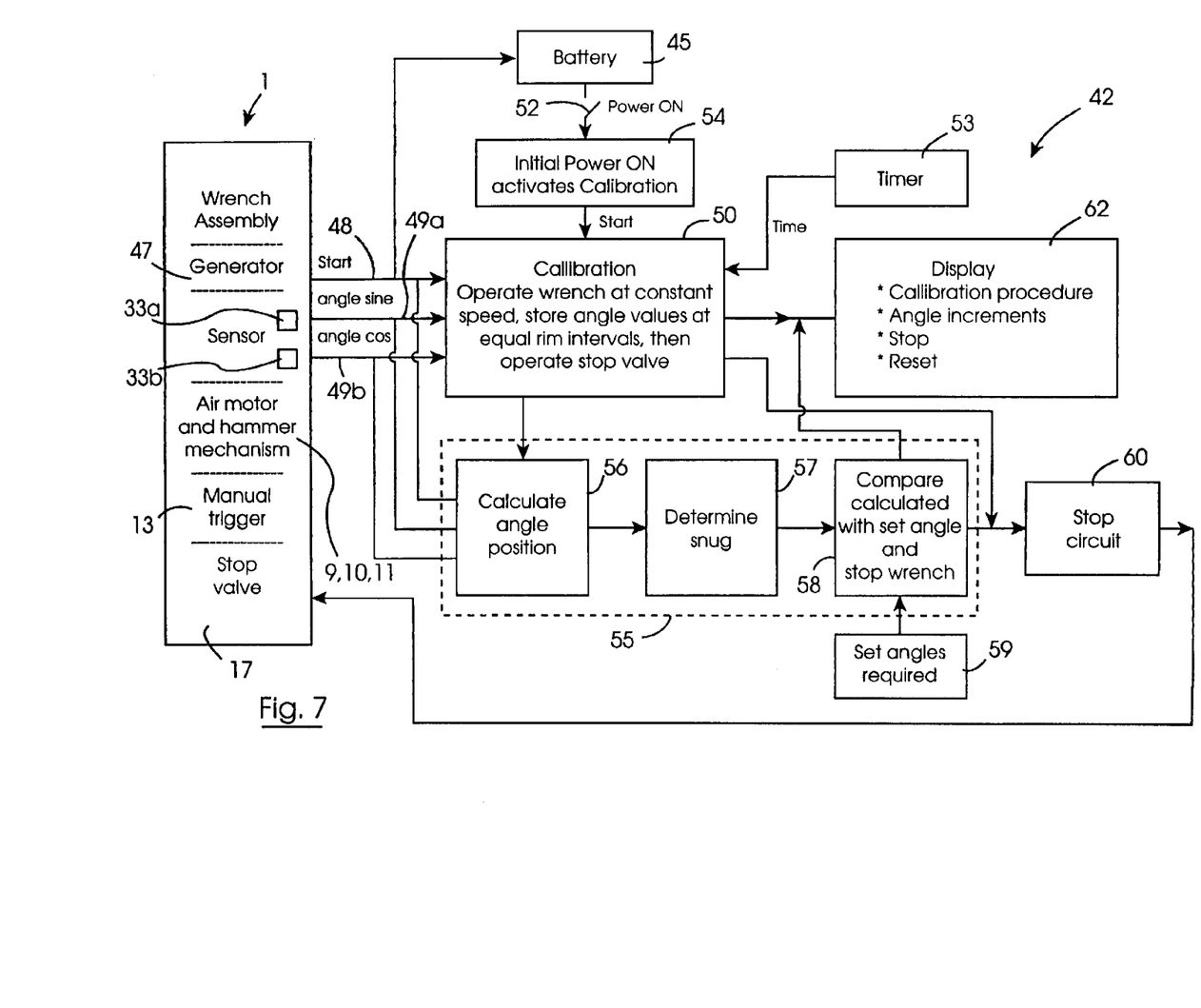
FIG. 7 is a block representation of a monitoring and control circuit of the impact wrench of FIG. 1.

A control circuit 42, see FIG. 7, reads electronic output signals from the photo sensors 33 for determining the absolute angular position of the output shaft 5. However, before describing the control circuit 42 in detail, the signals outputted by the respective photo sensors 33 as the output shaft 5 rotates will first be described with reference to FIGS. 7 and 8.

Figure 8:
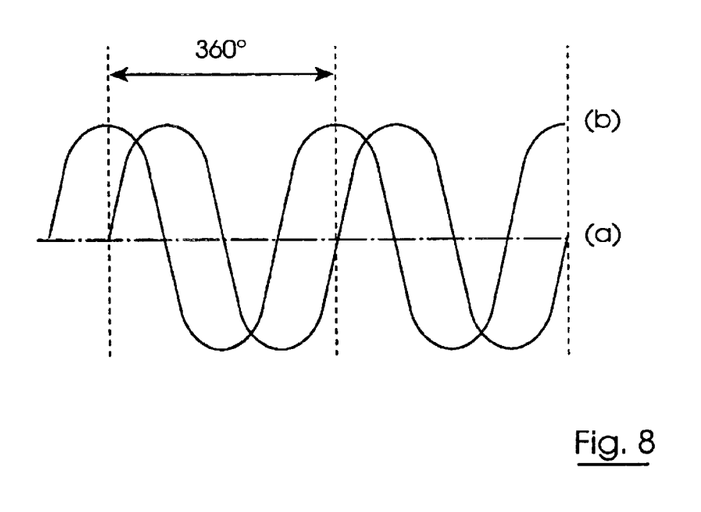
FIG. 8 is a graphical representation of signals of the impact wrench of FIG. 1.

Referring now to FIG. 8, the output signals from the photo sensors 33 are substantially similar, with the exception that since the photo sensors 33a and 33b are angularly disposed at 90° to each other around the output shaft 5 the output signals from the photo sensors 33a and 33b are 90° out of phase with each other. FIG. 8 illustrates the signals from the photo sensors 33a and 33b plotted against time for two 360° revolutions of the output shaft 5 when the output shaft 5 is continuously rotating at constant speed. The curve (a) represents the output from the photo sensor 33a, and the curve (b) represents the output from the photo sensor 33b. When the output shaft 5 is continuously rotating at constant speed, the output signals from the photo sensors 33 are sinusoidal, and since they are 90° out of phase with each other, one can be considered to be a sine wave, and the other a cosine wave in real time, as shown in FIG. 8.

Figure 9:
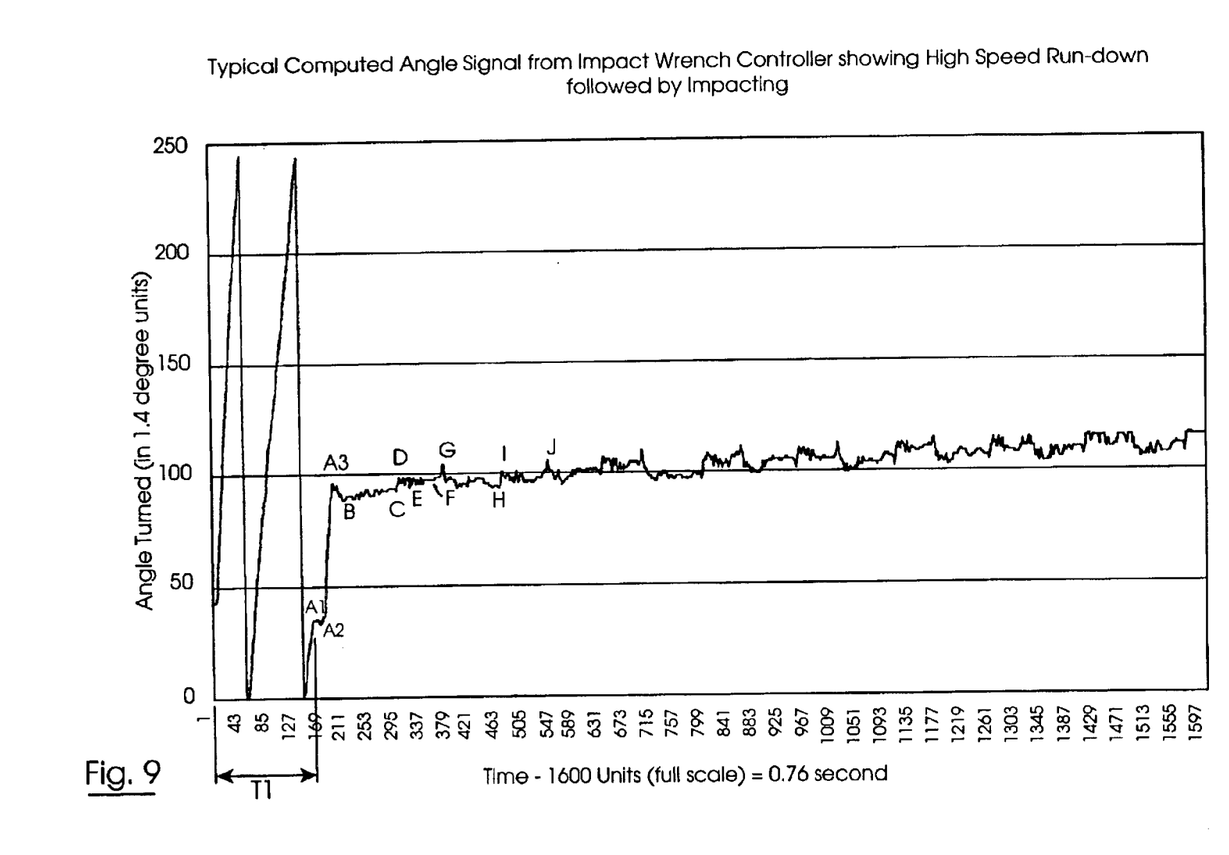
FIG. 9 is a graphical representation of absolute positions of an output shaft of the impact wrench of FIG. 1.

FIG. 9 illustrates a plot of the absolute angular position of the output shaft 5 against time which is computed by the monitoring and control circuit 42 from the output signals of the photo sensors 33a and 33b. During the period of time $T_1$ the output shaft 5 is running continuously at constant speed tightening the fastener. During the period of time $T_1$, approximately two and one half full cycles of the output shaft 5 are illustrated, namely, two and one half revolutions of the output shaft 5, each revolution being through 360°. The output shaft 5 is rotating at a relatively rapid speed of approximately 2,400 rpm, or one 360° revolution in each $$\frac{1}{40}$$

second during the time period $T_1$. At the end of the time period $T_1$ at point $A_1$ of the curve, rotation of the output shaft 5 stops dead. This could represent the angular position of the shaft corresponding to the snug point of the fastener, or it could be an indication that the snug point of the fastener is being approached. On stopping dead at the angular position corresponding to the point Al, the output shaft 5 bounces back due to backlash between the output shaft 5 and the fastener being tightened. The point $A_2$ on the curve of FIG. 9 represents the absolute angular position of the output shaft 5 after bounce-back. Once the output shaft 5 stops dead at the absolute angular position represented by the point $A_1$ on the curve of FIG. 9, the impact wrench operates in the impact mode, and the hammer mechanism 10 imparts the first pulsed tightening moment on the output shaft 5, which urges the output shaft from the absolute position represented by the point $A_2$ to the absolute angular position represented by the point $A_3$.

As can be seen in this case, the first pulsed tightening moment advances the output shaft 5 through a forward angular displacement of approximately 85°. The monitoring and control circuit 42 as will be described below compares this angular displacement with a first reference angular displacement which corresponds to the maximum angular displacement through which the output shaft 5 would rotate if the snug point had been reached. In this case, the angular displacement of 85° is significantly in excess of the first reference angular displacement, and it is deemed that the snug point of the fastener had not been reached at the point $A_1$. Due to backlash the output shaft 5 bounces back from the absolute angular position represented by the point $A_3$ on the curve of FIG. 9 to an absolute angular position represented by the point B, and then settles at an absolute angular position represented by the point C. During the period between the point B and the point C while the next pulsed tightening moment is awaited, noise can be seen on the curve between the point B and the point C. This noise may come from various sources, but is insignificant and does not affect the operation of the monitoring and control circuit 42. The point C represents the absolute angular position of the output shaft 5 when the next pulsed tightening moment is applied on the output shaft 5. The pulsed tightening moment advances the output shaft 5 through an angular displacement to an absolute angular position represented by the point D on the curve of FIG. 9. The angular displacement between the points C and D is approximately 10°, and is deemed to be less than the first reference angular displacement. Thus, the fastener is deemed to have been tightened to its snug point when the output shaft 5 was at the absolute angular position represented by the point C on the curve of FIG. 9.

The monitoring and control circuit 42 monitors the angular displacement of the output shaft 5 from the absolute angular position represented by the point C until the output shaft 5 has rotated through a second reference angular displacement, at which stage the fastener is deemed to have been tightened to the desired degree of tightness. In this case, after the point D the output shaft 5 bounces back to an angular position represented by the point F on the curve 9. Between the points D and F noise which is insignificant is experienced. The next pulsed tightening moment advances the output shaft 5 from an absolute angular position represented by the point F to an angular position represented by the point G. Further bounce-back and noise is experienced and the output shaft 5 settles at an absolute angular position represented by the point H. The next two pulsed tightening moments advance the output shaft 5 through further angular displacement to respective absolute angular positions represented by the points I and J. At the absolute angular position represented by the point J, the monitoring and control circuit 42 determines that the absolute angular displacement of the output shaft 5 from the snug point represented by the point C is equal to or greater than the second reference angular displacement, and the fastener 5 is deemed to be tightened to the predetermined tightness.

Since the output shaft 5 is continuously engaged with the fastener, the angular displacement of the output shaft 5 for each pulsed tightening moment is similar to the angular displacement of the fastener allowing for backlash which may result from a loose fitting socket or fastener engaging element engaged on the fastener. However, any discrepancy resulting from backlash between the angular rotation of the fastener and the output shaft 5 is taken account of provided that the angular displacement is measured from the points $A_2$, C, E, F, H, etc. of the curve of FIG. 9 in response to the corresponding next pulsed tightening moment rather than from the points $A_1$, $A_3$, D, G, etc., thereby eliminating the effect of backlash.

The value of the second reference angular displacement will vary depending on the joint, the fastener being tightened, and in particular, on the diameter, thread size and material of the fastener, and typically will lie in the range of 30° to 120° and, in general, in the range of 30° to 90°. The value of the first reference angular displacement, in general, will be a fixed value of approximately 20°, although provision may be made for selectively altering it.

It is known that once the snug point of a fastener has been reached, the angular displacement of the fastener from its snug point is proportional to the tightness of the fastener, and therefore indirectly to the torque applied. Thus, by determining the total forward angular displacement of the output shaft in the direction in which the pulsed tightening moments are being applied from the snug point position a determination as to when the fastener is tightened to the predetermined tightness can be made.

Referring now to FIG. 7, the monitoring and control circuit 42 will now be described. The monitoring and control circuit 42 is powered by a rechargeable battery 45. A pneumatically powered electrical generator 47 is located in the handle 4 of the input wrench 1 through which exhaust air from the pneumatic motor 11 is exhausted. The exhaust air operates the generator 47 for charging the battery 45, and also for providing a start signal on the line 48 for commencing operation of the circuit 42. The output signals from the photo sensors 33a and 33b are voltage signals, the voltage of which is proportional to the intensity of the light received, and thus, inversely proportional to the degree of occlusion of the corresponding bores 34. The output signals are delivered to the circuit 42 on lines 49a and 49b, respectively. The circuit 42 comprises a calibration circuit 50 for calibrating the impact wrench 1 each time on start-up as will be described below. A power supply switch 52 which is located in the handle 4, but not illustrated in FIG. 1 powers the circuit 42 from the battery 45. A calibration initiating circuit 54 initiates calibration in response to the power switch 52. A timer circuit 53 co-operates with the calibration circuit 50 for calibration of the impact wrench 1.

A computing means, namely, a computing circuit 55 comprises a first block 56 which continuously determines the absolute angular position of the output shaft 5 from signals received from the photo sensors 33a and 33b. A second block 57 determines when the fastener has been tightened to its snug point, and a third block 58 determines when the output shaft 5 has been rotated through an angular displacement from its snug point position corresponding to the second reference angular displacement for determining when the fastener has been tightened to the predetermined tightness.

An input circuit 59 facilitates inputting of the second reference angular displacements. The first reference angular displacement is pre-programmed and stored in the second block 58. A stop circuit 60 in response to the third block 58 determining that the fastener has been tightened to the predetermined tightness outputs a signal to the cut-out valve 17 for isolating the impact wrench 1 from the pneumatic supply, thereby terminating tightening of the fastener. A visual display 62 is provided for displaying an indication to a user that calibration of the impact wrench 1 is being carried out, and for indicating completion of calibration. The visual display 62 also displays the angular displacement of the output shaft 5 resulting from each pulsed tightening moment. The visual display 62 also indicates when the fastener has been tightened to the predetermined tightness, and indicates when the impact wrench 1 is reset and ready for the next fastener to be tightened.

Initially the impact wrench 1 is connected to the pneumatic supply, and the power switch 52 is closed, thus supplying the circuit 42 with power from the battery 45. The closing of the power switch 52 activates the calibration initiating circuit 54 which sets the calibration circuit 50 to be ready to commence calibration. The impact wrench 1 is calibrated by running the impact wrench 1 in a no load state, in other words, disconnected from a fastener, and in the no load state the output shaft 5 runs continuously at constant speed. Once the generator 47 commences to generate power, the power output signal on the line 48 activates the calibration circuit 50 to commence calibration.

Figure 10:
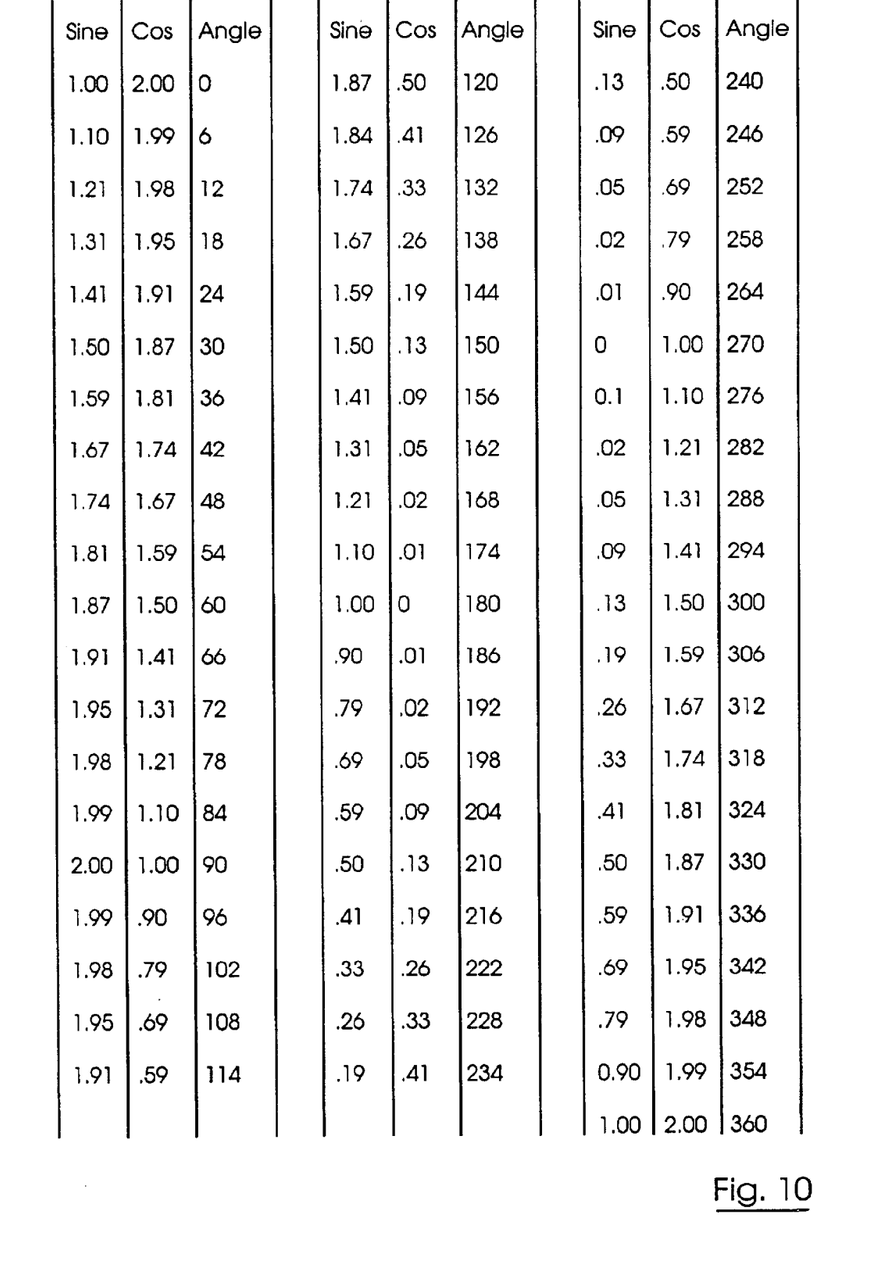
FIG. 10 is a look-up table of the impact wrench of FIG. 1.

The calibration circuit 50 reads the signals from the first and second sensors 33a and 33b on the lines 49a and 49b. At predetermined time intervals the signals are read, and a look-up table is compiled which correlates the voltage values of the voltage output signals of the sensors 33a and 33b against absolute angular positions of the output shaft 5. A typical look-up table is illustrated in FIG. 10. The output voltage values of the sensor 33a are set out in column 1, while the output voltage values of the sensor 33b are set out in column 2. The corresponding angular value of the output shaft 5 is set out in column 3. While for convenience the look-up table shows the angle increments being 6°, in practice reading of the output signals of the sensors 33a and 33b will be taken at sufficiently frequent intervals so that the angle increments will be approximately 1.5°.

Once the look-up table has been compiled, calibration is completed, and a signal is sent to the computing circuit 55 indicating that calibration has been completed and the impact wrench 1 is ready for normal operation. The calibration circuit 50 outputs a signal to the visual display 62 during calibration to select a display indicating that calibration is in progress, and on calibration being completed a further signal is outputted by the calibration circuit 50 to the visual display 62 for indicating completion of calibration. The calibration circuit also outputs a signal on the completion of calibration to the stop circuit 60 which trips the cut-out valve 17 to isolate the impact wrench from the pneumatic supply, thus also indicating termination of calibration.

An operator then wishing to tighten a fastener inputs the second reference angular displacements through the input 59, and connects the impact wrench 1 to the fastener by, for example, a socket or other suitable element, and on depressing the trigger 14 air is supplied from the pneumatic supply to the motor 11. The output signal from the generator 47 on the line 48 activates the first block 56 for determining the absolute angular position of the output shaft 5. The first block 56 reads the output signals from the sensors 33a and 33b and from the look-up table of FIG. 10 continuously determines the absolute angular position of the output shaft 5.

When continuous rotation of the output shaft 5 ceases, the impact wrench 1 commences to output pulsed tightening moments in response to the hammer mechanism 10. On continuous rotation of the output shaft 5 ceasing, the absolute angular position of the shaft 5 is stored by the second block 57. After the first pulsed tightening moment has been outputted on the output shaft 5, the absolute angular position of the output shaft 5 is again determined, and the second block 57 determines if the angular displacement of the output shaft 5 from the previous angular position is less than the first reference angular displacement, and if so, the block 57 determines that the previous absolute angular position of the output shaft 5 is the snug point position. Otherwise, the impact wrench continues to output pulsed tightening moments until the block 57 determines that the angular displacement of the output shaft resulting from the last pulsed tightening moment is less than the first reference angular displacement, thus indicating that the previous absolute angular position of the shaft is the snug point position which corresponds to the snug point of the fastener. On the snug point position being determined, the absolute angular position of the snug point of the shaft is stored in the third block 58, which then reads the cumulative angular displacements of the output shaft 5 resulting from each pulsed tightening moment until the output shaft 5 has been displaced through the second reference angular displacement from the snug point position. On the third block 58 determining that the output shaft has rotated through the second reference angular displacement from the snug point position, the fastener is deemed to be tightened to the predetermined tightness, and the block 58 outputs a signal to the stop circuit, which in turn outputs a signal to the cut-out valve 17 for isolating the impact wrench 1 from the pneumatic supply, thereby terminating tightening of the fastener.

In this embodiment of the invention two selector switches (not shown) are provided for facilitating inputting of the first and second reference angular displacements.

Each selector switch is a multi-selector switch, thus allowing for one of a number of first and second reference angular displacements to be selected and inputted.

In use, the impact wrench 1 is operated as already described. Initially, the impact wrench 1 is operated with no load on the output shaft 5, which is run continuously at constant speed to facilitate calibration. On completion of calibration the output wrench 1 is connected to the fastener to be tightened, and tightening of the fastener proceeds as already described.

Each time the cut-out solenoid valve 17 isolates the impact wrench 1 from the pneumatic supply, the cut-out valve 17 is reset automatically.

While the detectable means has been described as being provided by an eccentrically disposed member, other suitable detectable means may be used. For example, the detectable means could provide a detectable characteristic, which could, for example, be a magnetic characteristic, and by monitoring the magnetic field generated by the detectable means as the output shaft rotated, a determination of the angular displacement and the absolute position of the output shaft could be made. Needless to say, other suitable detectable means which provide a detectable characteristic could be used. Indeed, it will be appreciated that instead of determining the angular displacement of the output shaft and its absolute position by monitoring the position of the eccentrically disposed member using light sensing means, other suitable sensing means may be provided, for example, a proximity sensor, an inductive sensor, a magnetic or other optical sensors.

Additionally, it will be appreciated that where the detectable means provides a detectable magnetic field, it will be appreciated that the detectable member need not be provided by an eccentrically disposed member, indeed, a magnet located in the output shaft eccentrically relative to the rotational axis of the output shaft would be sufficient.

While the impact wrench has been described as being pneumatically powered, the impact wrench may be powered by any other suitable means, for example, the impact wrench may be powered by an hydraulic power supply through an hydraulic motor, or by an electrically powered motor.

Additionally, while the apparatus for determining when a fastener is tightened to a predetermined tightness has been described as being incorporated in an impact wrench, the apparatus may be incorporated in any other type of pulsed output tightening tool. Additionally, while the eccentrically disposed member has been described as being integrally formed with the output shaft, it will be appreciated that the apparatus according to the invention for determining when a fastener is tightened to a predetermined tightness could be supplied separately from the impact wrench to be retrofitted to existing impact wrenches. Indeed, it is envisaged that the apparatus according to the invention for determining when a fastener is tightened to a predetermined degree of tightness could be retrofitted externally of the impact wrench on the output shaft by mounting the apparatus on the receiver at the end of the output shaft, and providing a receiver extending from the apparatus for receiving a socket or other suitable fastener engaging element. In which case, the apparatus could be anchored to the casing of the impact wrench, and the monitoring circuitry could be provided in a separate casing associated with the apparatus 20.

It is also envisaged that the cut-out valve 17 may be located within the impact wrench housing, and indeed, where the cut-out valve 17 is located externally of the housing of the impact wrench, it may be located remotely of the impact wrench, and in which case it is envisaged that a radio transmitter may be provided in the stop circuit for transmitting a stop signal to a receiver adjacent the cut-out valve 17 which would trip the cut-out valve.

What is claimed is:

1. Apparatus for use in a pulsed output tightening tool for determining when fastener being tightened by a rotatable output means of the tool is tightened to a predetermined tightness, the apparatus comprising a detectable means for mounting on the rotatable output means of the tool and being rotatable therewith for providing a detectable characteristic as the output means rotates about its rotational axis, and a monitoring means for monitoring the detectable means for determining rotational angular displacement of the output means, characterized in that the detectable means provides the detectable characteristic as a characteristic which alternately and smoothly cycles between a minimum value and a maximum value as the output means rotates, and a pair of monitor means are disposed at angularly spaced apart locations around the detectable means operating with the detectable means for outputting signals indicative of the absolute angular position of the output means, for facilitating a determination of the angular displacement of the output means in response to each pulsed output of the output means for determining when the fastener is tightened to the predetermined tightness.

2. Apparatus as claimed in claim 1 characterized in that the respective monitoring means are disposed at 90° to each other around the detectable means.

3. Apparatus as claimed in claim 1 characterized in that the detectable characteristic of the detectable means cycles through each of the minimum and maximum values of the detectable characteristic at least once for each 360° angular displacement of the output means.

4. Apparatus as claimed in claim 1 characterized in that each monitoring means outputs an electronic signal, and the monitoring means cooperate with each other for detecting the absolute angular position of the output means.

5. Apparatus as claimed in claim 1 characterized in that a means is provided for determining when the fastener is tightened to its snug point.

6. Apparatus as claimed in claim 5 characterized in that the means for determining when the fastener is tightened to its snug point is responsive to the monitoring means detecting the first stalling of the output means after tightening of the fastener commences.

7. Apparatus as claimed in claim 5 characterized in that the means for determining when the fastener is tightened to its snug point is responsive to the monitoring means detecting the angular displacement of the output means being less than a first reference predetermined angular displacement in response to one pulsed output of the output means.

8. Apparatus as claimed in claim 5 characterized in that the means for determining when the fastener is tightened to the predetermined tightness is responsive to the monitoring means determining that the rotatable output means has rotated a second reference predetermined angular displacement from its snug point position.

9. Apparatus as claimed in claim 1 characterized in that the detectable means comprises an eccentrically disposed member eccentrically disposed relative to the output means, the eccentrically disposed member defining a central axis, and being adapted for mounting on the output means with the central axis of the eccentrically disposed member spaced apart from and parallel to the rotational axis of the output means for causing the eccentrically dispose member to rotate eccentrically with the output means.

10. Apparatus as claimed in claim 1 characterized in that each monitoring comprises a light sensing means, each light sensing means cooperating with the detectable means so that light passing the detectable means to the light sensing means is at least partially occluded by the detectable means as the output means rotates, and the degree of occlusion alternates between minimum and maximum values corresponding to the minimum and maximum values of the detectable characteristic.

11. Apparatus as claimed in claim 7 characterized in that a body member is provided adjacent the detectable means, and a pair of light accomodating bores extend through the body member for directing light onto the corresponding light sensing means, an opening being provided into each light accomodating bore for accomodating the detectable means into the light accomodating bores as the output means rotates so that each light accomodating bore is at least partly occluded by the detectable means as the output means rotates, the degree of occlusion alternating between the respective minimum and maximum values thereof as the output means rotates.

12. Apparatus as claimed in claim 11 characterized in that a light source is provided at one end of each light accomodating bore and the corresponding light sensing means is provided at the other end thereof, the openings for accomodating the detectable means into the respective light accomodating bores being located intermediate the ends thereof.

13. Apparatus as claimed in claim 11 characterized in that at maximum occlusion the detectable means substantially occludes the corresponding light accomodating bore.

14. Apparatus as claimed in claim 1 characterized in that the apparatus comprises a calibrating means for calibrating the apparatus, the calibrating means being operable for calibrating the apparatus when the output means is rotating at a substantially constant speed.

15. A pulsed output tightening tool comprising an output means rotatably mounted about a rotational axis for intermittently imparting a pulsed tightening moment to a fastener for tightening thereof, a detectable means being mounted on the output means and being rotatable therewith for providing a varying detectable characteristic as the output means rotates, and a monitoring means for monitoring the detectable means for determining rotational angular displacement of the output means characterized in that the detectable means provides the detectable characteristic as a characteristic which alternately and smoothly cycles between a minimum value and a maximum value as the output means rotates, and a pair of monitoring means are disposed at angularly spaced apart locations around the detectable means cooperating with the detectable means for outputting signals indicative of the absolute angular position of the output means, for facilitating a determination of the angular displacement of the output means in response to each pulsed output of the output means for determining when the fastener is tightened to the predetermined tightness.

16. A pulsed output tightening tool as claimed in claim 15 characterized in that the respective monitoring means are disposed at 90° to each other around the detectable means.

17. A pulsed output tightening tool as claimed in claim 15 characterized in that the detectable characteristic of the detectable means cycles through each of the minimum and maximum values of the detectable characteristic at least once for each 360° angular displacement of the output means.

18. A pulsed output tightening tool as claimed in claim 15 characterized in that each monitoring means outputs an electronic signal, and the monitoring means cooperate with each other for detecting the absolute angular position of the output means.

19. A pulsed output tightening tool as claimed in claim 15 characterized in that a means is provided for determining when the fastener is tightened to its snug point.

20. A pulsed output tightening tool as claimed in claim 19 characterized in that the means for determining when the fastener is tightened to its snug point is responsive to the monitoring means detecting the first stalling of the output means after tightening of the fastener commences.

21. A pulsed output tightening tool as claimed in claim 19 characterized in that the means for determining when the fastener is tightened to its snug point is responsive to the monitoring means detecting the angular displacement of the output means in response to a pulsed output being less than a first reference predetermined angular displacement.

22. A pulsed output tightening tool as claimed in claim 19 characterized in that the means for determining when the fastener is tightened to the predetermined tightness is responsive to the monitoring means determining that the rotatable output means has rotated a second reference predetermined angular displacement from its snug point position.

23. A pulsed output tightening tool as claimed in claim 15 characterized in that the detectable means comprises an eccentrically disposed member eccentrically disposed relative to the output means, the eccentrically disposed member defining a central axis, and being mounted on the output means with the central axis of the eccentrically disposed member spaced apart from and parallel to the rotational axis of the output means for causing the eccentrically disposed member to rotate eccentrically with the output means.

24. A pulsed output tightening tool as claimed in claim 15 characterized in that each monitoring means comprises a light sensing means, each light sensing means cooperating with the detectable means so that light passing the detectable means to the light sensing means is at least partially occluded by the detectable means as the output means rotates, and the degree of occlusion alternates between minimum and maximum values corresponding to the minimum and maximum values of the detectable characteristic.

25. A pulsed output tightening tool as claimed in claim 17 characterized in that a body member is provided adjacent the detectable means, and a pair of light accomodating bores extend through the body member for directing light onto the corresponding light sensing means, an opening being provided into each light accomodating bore for accomdating the detectable means into the light accomodating bores as the output means rotates so that each light accomodating bore is at least partly occluded by the detectable means as the output means rotates, the degree of occlusion alternating between the respective minimum and maximum values thereof as the output means rotates.

26. A pulsed output tightening tool as claimed in claim 25 characterized in that at maximum occlusion the detectable means substantially occludes the corresponding light accomodating bore, and at minimum occlusion the detectable means just slightly occludes the corresponding light accomodating bore.

27. A pulsed output tightening tool as claimed in claim 25 characterized in that a light source is provided at one end of each light accomodating bore and the corresponding light sensing means is provided at the other end thereof, the openings for accomodating the detectable means into the respective light accomodating bores being located intermediate the the ends thereof.

28. A pulsed output tightening tool as claimed in claim 15 characterized in that the pulsed output tightening tool is an impact wrench, and the output shaft extends from an anvil, a hammer mechanism being provided for cooperating with the anvil for intermittently impacting with the anvil for providing the respective pulsed tightening moments, a drive means comprising a pneumatic motor being provided for operating the hammer mechanism for intermittently impacting with the anvil, and a pneumatic turbine electrical generator being located adjacent an exhaust from the pneumatic motor for recovering power from the exhaust of the pneumatic motor for generating electricity for powering the monitoring means.

29. A method for determining when a fastener is tightened to a predetermined tightness by a rotatable output means of a pulsed output tightening tool, the method comprising the steps of locating a detectable means on the rotatable output means of the tool to be rotatable with the output means for providing a varying detectablee characteristic as the output means rotates about its rotational axis, and providing a monitoring means for monitoring the detectable means for determining rotational angular displacement of the output means, characterized in that the detectable means provides the detectable characteristic as a characteristic which alternately and smoothly cycles between a minimum value and a maximum value as the output means rotates, and a pair of monitoring means are disposed at angularly spaced apart locations around the detectable means and cooperated with the detectable means for outputting signals indicative of the absolute angular position of the output means for facilitating a determination of the angular displacement of the output means in response to each pulsed output of the output means for determining when the fastener is tightened to the predetermined tightness.

30. A method as claimed in claim 22 characterized in that the respective monitoring means are disposed at 90° to each other around the detectable means.

31. A method as claimed in claim 29 characterized in that the detectable characteristic of the detectable means cycles through each of the minimum and maximum values of the detectable characteristic at least once for each 360° angular displacement of the output means.

32. A method as claimed in claim 29 characterized in that the method further comprises determining when the fastener is tightened to its snug point, the snug point being determined in response to the monitoring means detecting the first stalling of the output means after tightening of the fastener commences, and the fastener is determined as being tightened to the predetermined tightness when the output means has rotated a second reference predetermined angular displacement from the snug point position.

* * * * *